Patented Oct. 4, 1932

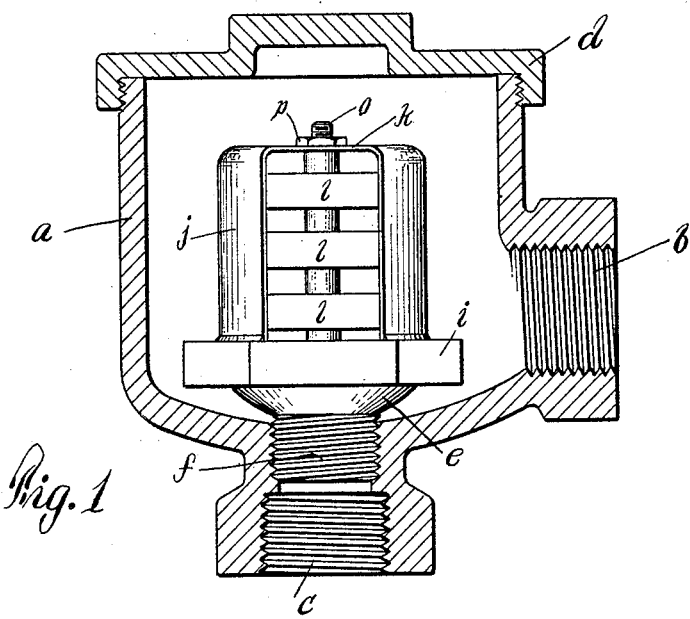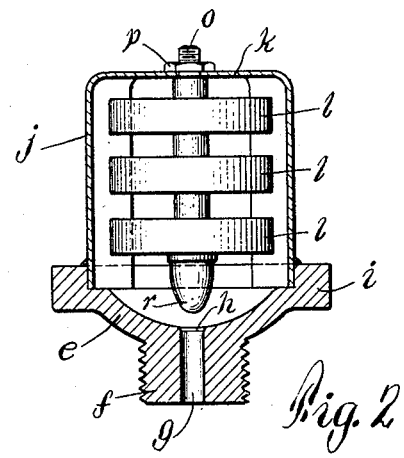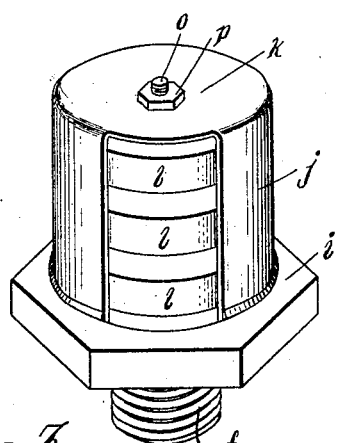

1,881,246

UNITED STATES PATENT OFFICE

WILLIAM K. SIMPSON, OF WATERBURY, CONNECTICUT, ASSIGNOR TO HOFFMAN SPECIALTY COMPANY, OF WATERBURY, CONNECTICUT, A CORPORATION OF ILLINOIS

THERMOSTATIC VALVE UNIT

Application filed September 19, 1928. Serial No. 306,912.

The present invention relates to thermostatic valves, traps, and the like, and its object is to provide a self contained unit comprising a valve seat, valve, and thermostatic element, all assembled and associated in a unitary structure which may be marketed and installed in the casing of a trap or valve as a unit, and the elements of which are organized to sustain all the thrusts and reactions of the thermostat. The invention comprises essentially a valve seat fitting, having means for securing it in place or being so constructed that it may be readily so secured, a valve complemental to the seat portion of said fitting, a thermostat arranged to actuate the valve, and a support for said thermostat connected to the valve seat fitting so that the thrusts and reactions of the valve and thermostat are sustained by the fitting. An embodiment of the principles of the invention in one of its numerous possible forms is shown for illustration in the accompanying drawing and described in detail in the following specification.

In the drawing,—

Fig. 1 is a sectional view of a steam trap having my novel thermostatic valve unit applied thereto;

Fig. 2 is a sectional view of the thermostatic valve unit by itself, removed from the trap body;

Fig. 3 is a perspective view of the thermostatic valve unit.

Like reference characters designate the same parts wherever they occur in all the figures.

$a$ represents the casing of a steam trap having an inlet in the side at $b$, an outlet in the bottom at $c$, and a removable cap or cover $d$ for its open upper end. This represents and typifies any trap or valve structure adapted to contain a thermostatically controlled valve and to be used in any situation which calls for the discharge of a fluid at one temperature level, as water of condensation or air, and the retention of another fluid, as steam, at a different temperature level.

$e$ represents a valve seat fitting having a threaded nipple $f$ which is screwed into the tapped upper end of the outlet passage, a bore $g$ opening to said passage and having a valve seat $h$ at its upper end, and a flange $i$, which is preferably formed externally of hexagonal outline, or other non-circular shape, so that the fitting can be screwed into the casing.

A thermostat support $j$ is secured to the flange part of the valve seat fitting. Conveniently this support is a cage or frame of cup-like form having a wall $k$ at one end and being open at the opposite end. The open end is set into a recess in the upper side of the valve seat fitting and is secured therein by making a threaded joint therewith, by solder, by both screw threads and solder, or by any other suitable means. The sides of this frame are interrupted or otherwise formed with openings to permit passage of the fluid to be discharged from the trap, as well as to admit access to the thermostat of the fluid to be restrained.

A thermostat $l$, comprising a series of shallow boxes or drums having flexible diaphragms for end walls, and connected to one another in series with internal communication between them, is contained within the cage or holder $j$. One end of the thermostat is provided with a stem $o$ which passes through the end wall $k$ of the holder and is secured by a nut $p$. The opposite end of the thermostat carries a valve $r$ in position to cooperate with the valve seat $h$.

The thermostat here shown illustratively is one of a type containing volatile liquid which, when heated, bulges the diaphragms of the several drums and gives seating movement to the valve equal to the sum of the movements of all the diaphragms; and when condensed by cooling contracts the thermostat and opens the valve. Other expansible volatile liquid thermostats, including those of the bellows type for instance, are equivalent to the specific thermostat here illustrated, for the purposes of this invention, and so also are thermostats of other types, whether influenced by volatile fluid or by expansion and contraction of metal, or by unequal expansion and contraction of different metals connected side by side to one another. So also is the specific nature of the holder for the thermostat immaterial in the broad view of this invention, for supporting means of different forms and structures may be used with thermostats of different types, proportions and capacities.

The new step of my invention, broadly considered, does not reside in an improvement in the thermostat itself or in the supporting means therefor, but in the combination of thermostat and supporting means with a valve seat fitting in such fashion that the fitting entirely supports the thermostat holder and sustains the reaction of the forces applied by the thermostat. However, from the more specific point of view, it includes all novel features of the particular embodiment of such combination herein illustrated. It is plain from the disclosure herein that a rigid connection is provided between the thermostat holder $j$ and the valve seat fitting, whereby the latter supports the thermostat and also sustains the thrust which the latter exerts when expanding and when pressing the valve against its seat. No external abutment is needed for the thermostat holder, and the trap body performs no function in that regard except as it supports the valve fitting itself. But whether in or out of the trap casing the thermostatic valve unit is self contained, and the valve will be opened and closed when exposed to the temperatures at which it is designed to be opened and closed, respectively. This unit is likewise capable of being shipped to customers as a self contained article, secure against accidental dismemberment, and to be placed and secured as such in any trap casing or body to which it is fitted by virtue of its dimensions. Any unit embodying essentially this combination adapted to the same purposes and uses is within the scope of my invention and of the protection which I claim, even though in the characteristics of its constituent members and their relation to one another, it may vary much from the illustrative embodiment here shown.

Analyzing the device for the purpose of concise generic definition, the end wall $k$ of the thermostat holder is essentially an abutment for the thermostat, and the side walls or lateral members of the holder are essentially rigid tie members by which the said abutment is connected to the valve seat fitting and is maintained at a fixed distance from the valve seat. The valve seat fitting is likewise the base of the unit, constituting the support for all of the parts thereof.

Units of the character described may be mounted in traps of many various designs and types adapted for various purposes and uses. The several parts of the unit may be made of any materials suitable for the purpose.

What I claim and desire to secure by Letters Patent is:

1. A thermostatic valve unit comprising a base having a screw-threaded nipple adapted to be screwed into the outlet of a trap casing and having also a passageway with a surrounding valve seat, a thermostat holder secured to said base and having an abutment portion, an expansible thermostat secured to said abutment portion within said holder, and a valve carried by said thermostat adjacent to said valve seat and adapted to be moved against and away from the same by expansion and contraction, respectively, of the thermostat.

2. A thermostatic valve unit adapted for use in a steam trap comprising a base having a threaded nipple for mounting in the complementally threaded outlet passage of the trap casing, said base having a passage extending through said nipple and a valve seat continuously surrounding said passage and facing away from the outlet end of the passage, a thermostat holder secured to the base at the side thereof opposite to the nipple and having an abutment at its end remote from the base, a thermostat expansible by higher and contractible by lower, temperatures secured to said abutment between the latter and the base, and a valve complemental to said valve seat secured to the thermostat adjacent to the seat and arranged to be closed by expansion of the thermostat and opened by contraction of the thermostat.

3. In a steam trap of the type having a casing with inlet and outlet passages and a detachable cover over the open end opposite to the outlet passage, a thermostatic valve unit of dimensions suitable for entrance through such open end when the cover is removed and for being contained in the casing with the cover applied; said unit comprising a base having a nipple adapted to be mounted substantially steam-tight in the outlet passage and having in itself a through passage including an encircling continuous valve seat, a thermostat support of open formation to admit steam secured at one end to said base and including a transverse end wall at a distance from the base, an expansible and contractible volatile fluid thermostat secured to said end wall in alinement with said passage, and a valve cooperative with said valve seat secured to the end of the thermostat nearest thereto and located in such relation to said seat that it is closed against the same by expansion of the thermostat under the temperature of live steam and is withdrawn from the seat by contraction of the thermostat under a temperature somewhat lower than the condensing temperature of steam.

4. In a trap having a casing provided with inlet and outlet passages and an open side provided with a detachable cover opposite to one of said passages, a thermostatic valve unit of dimensions suitable for entrance through the open side when the cover is removed and for being contained in the casing with the cover applied, said unit comprising a base having a nipple insertable into one of said passages and engaged with the walls thereof in a manner such as to provide the sole supporting means for the unit, said base and nipple having a through passage including an encircling valve seat, supporting means joined to said base in a normally permanent and non-removable manner, a thermostat secured to said supporting means, and a valve body secured to said thermostat, adjacent to said valve seat in position to be closed against said seat and withdrawn therefrom by thermally-produced opposite actions of the thermostat.

5. In a trap having inlet and outlet passages, a self contained thermostatic valve unit comprising a base having coupling means for connection with the trap casing in one of the passages, and constituting the sole coupling therefor, said base having a passage opening into the said passage of the casing, a thermostat mounted on the base in exposure to the fluid within the casing, and a valve secured to the thermostat in position for closing and opening the passage in the said base with thermally-induced movements of the thermostat.

6. A thermostatic valve unit comprising a base having a central passage, a nipple extending from one side surrounding said passage and adapted to be inserted and secured within the outlet passage of a trap casing, an open cage or frame secured to said base and projecting therefrom to the opposite side from said nipple, an expansible and contractible thermostat secured to the cage and accessible by the fluid in the trap casing in which the unit is to be placed, and a valve carried by the thermostat in position to be moved by expansion and contraction of the thermostat into and out of closing relationship with the passage in the base.

7. The combination with a steam trap casing having a lateral inlet, an outlet passage in its bottom, an open top, and an imperforate cover removably applicable to its open top and adapted to close the same steam tight; of a self contained thermostatic valve unit removably insertable through the open top of the casing and completely enclosed by the cover and walls of the casing, said unit comprising a base and a thermostat abutment in rigid connection with one another, which base has a passageway and a valve seat, a thermostat connected to said thermostat abutment and a valve connected to the thermostat in alinement with said valve seat arranged to open and close against the latter with contraction and expansion respectively of the thermostat, and means for holding the thermostatic unit so that its passage registers with the outlet passage of the casing, comprising a nipple which protrudes from said base surrounding the passage in the latter and fits in the outlet passage of the casing.

8. The combination with a trap body having an open end, an imperforate cover detachably applied to said open end for closing the same in a steam tight manner, an outlet passage in the bottom, and an inlet passage; of a thermostatic valve unit comprising a valve member and a thermostat connected together, and a cage enclosing them having separated, rigidly connected abutments, to one of which the thermostat is secured, the other abutment being a base having a steam passage in alinement with the valve member, and a nipple surrounding said passage and fitted for detachable insertion into the outlet passage of the trap casing; said unit being inseparable from the trap bottom when the cover is in place.

9. The combination with a steam trap casing having a bottom, surrounding side walls and a removable steam tight cover constituting the top wall, and having also an outlet passage in its bottom and an inlet passage; of a self contained thermostatic valve unit contained in said casing and being removable therefrom through the opening provided by removal of said cover, said unit comprising a thermostat, a valve connected thereto, a thermostat abutment, and a base rigidly connected to said abutment and having a valve seat cooperating with said valve, and means for retaining said unit against displacement by steam pressure, said cover being constructed to prevent access to the unit of other forces or means tending to displace it.

In testimony whereof I have affixed my signature.

WILLIAM K. SIMPSON.